July 12, 1955 M. CAMRAS 2,713,091

ELECTROMAGNETIC TRANSDUCER HEAD

Filed June 2, 1951 2 Sheets-Sheet 1

Inventor
Marvin Camras by Hill, Sherman, Meroni, Gross & Simpson Attys

July 12, 1955 M. CAMRAS 2,713,091

ELECTROMAGNETIC TRANSDUCER HEAD

Filed June 2, 1951 2 Sheets-Sheet 2

Inventor:
Marvin Camras by Hill, Sherman, Meroni, Gross & Simpson
Attys 2,713,091
Patented July 12, 1955

2,713,091

ELECTROMAGNETIC TRANSDUCER HEAD

Marvin Camras, Chicago, Ill., assignor to Armour Research Foundation of Illinois Institute of Technology, Chicago, Ill., a corporation of Illinois Application June 2, 1951, Serial No. 229,618

6 Claims. (Cl. 179—100.2)

This invention relates to an electromagnetic transducer head and to an assembly therefor. More particularly, it relates to an electromagnetic transducer head assembly which is particularly suitable for use with moving picture film or for other uses where an extremely small head is required.

One common form of electromagnetic transducer head for magnetic recording and reproducing devices is a head having a core structure with confronting poles with a narrow non-magnetic gap therebetween and over which poles the magnetic record member successively passes. Such a head structure is thus of the type which employs what is commonly known as longitudinal magnetization. I have heretofore found that longitudinal magnetization is greatly improved, as is playback, if the record member passes over a relatively long iron path before it reaches the non-magnetic gap and then again passes over a long iron or other high permeability magnetic path before it leaves the head assembly. It has further been found that the core structures are much more efficient when they provide a substantially closed path for the flux in the head.

It has also been found in the past that the most efficient and economical type of electromagnetic transducer head construction used for record purposes is one in which the erasing or demagnetizing action takes place in the same general head construction as the recording operation. In such constructions, of course, two non-magnetic gaps are provided and so positioned and arranged that the magnetic record member first passes over the erase gap and then over the record gap.

One of the principal features and objects of the present invention is to provide a novel electromagnetic transducer head which is extremely economical to manufacture, which is efficient in operation, and which is rugged and reliable in use.

A further object of the present invention is to provide a novel electromagnetic transducer head having both an erase gap and a record gap therein and in which a pair of voice coils are mounted in such a manner as to balance out stray field effects on playback.

Another and further object of the present invention is to provide a novel structure for an electromagnetic transducer head which may be quickly and easily assembled and in which prompt and accurate fixing of the size of the gaps in the head are obtained.

Another and still further object of the present invention is to provide a novel mounting for the core pieces of an electromagnetic transducer head.

Still another and further object of the present invention is to provide a novel pole structure for an electromagnetic transducer head.

The novel features which I believe to be characteristic of my invention are set forth with particularity in the appended claims. My invention itself, however, both as to its organization, manner of construction, and method of assembly, together with further objects and advantages thereof, may best be understood by reference to the following description taken in connection with the accompanying drawings, in which:

Figure 1:
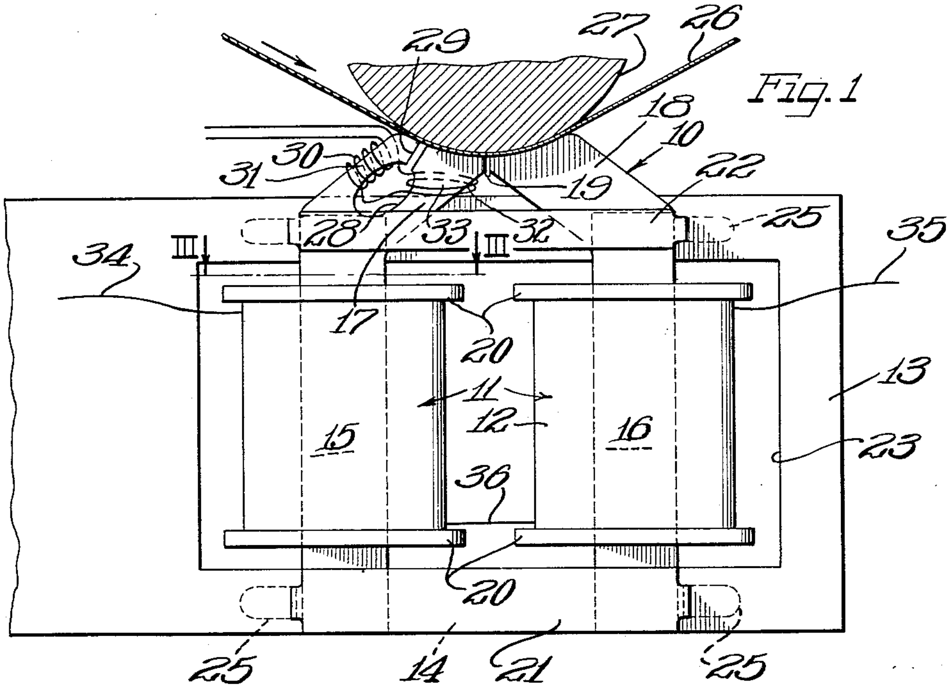
Figure 1 is a front elevational view, partly in section, of a novel electromagnetic transducer head embodying the teachings of the present invention, and positioned against a magnetic record member.
Figure 2:
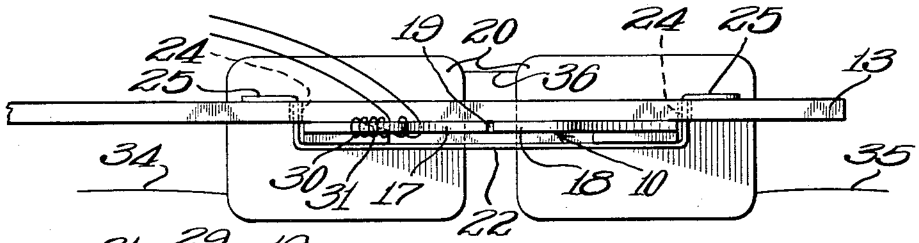
Figure 2 is a plan view of the electromagnetic transducer head of Figure 1 (with the record member and rotary stabilizer removed)

One embodiment of the present invention is illustrated in Figures 1 to 4 of the drawings and includes, in general, a core part 10, a pair of coils 11 and 12, and a mounting arm or frame 13, the latter being of non-magnetic material. The core part 10, as may be seen best from the exploded view (Figure 4), includes a bottom U-shaped base piece 14 and two upper legs 15 and 16 which extend generally toward each other at the top and provide a pair of pole portions 17 and 18 having a non-magnetic gap 19 therebetween. The non-magnetic gap 19 may be formed of any suitable non-magnetic material, such, for example, as a copper or mica spacer, or may be an air gap.

Figure 3:
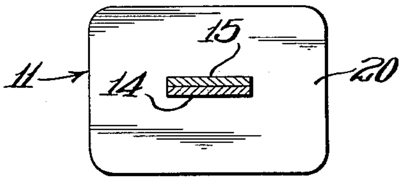
Figure 3 is a fragmentary, horizontal sectional view as taken along the line III—III of Figure 1.
Figures 5, 6, 7, 8:
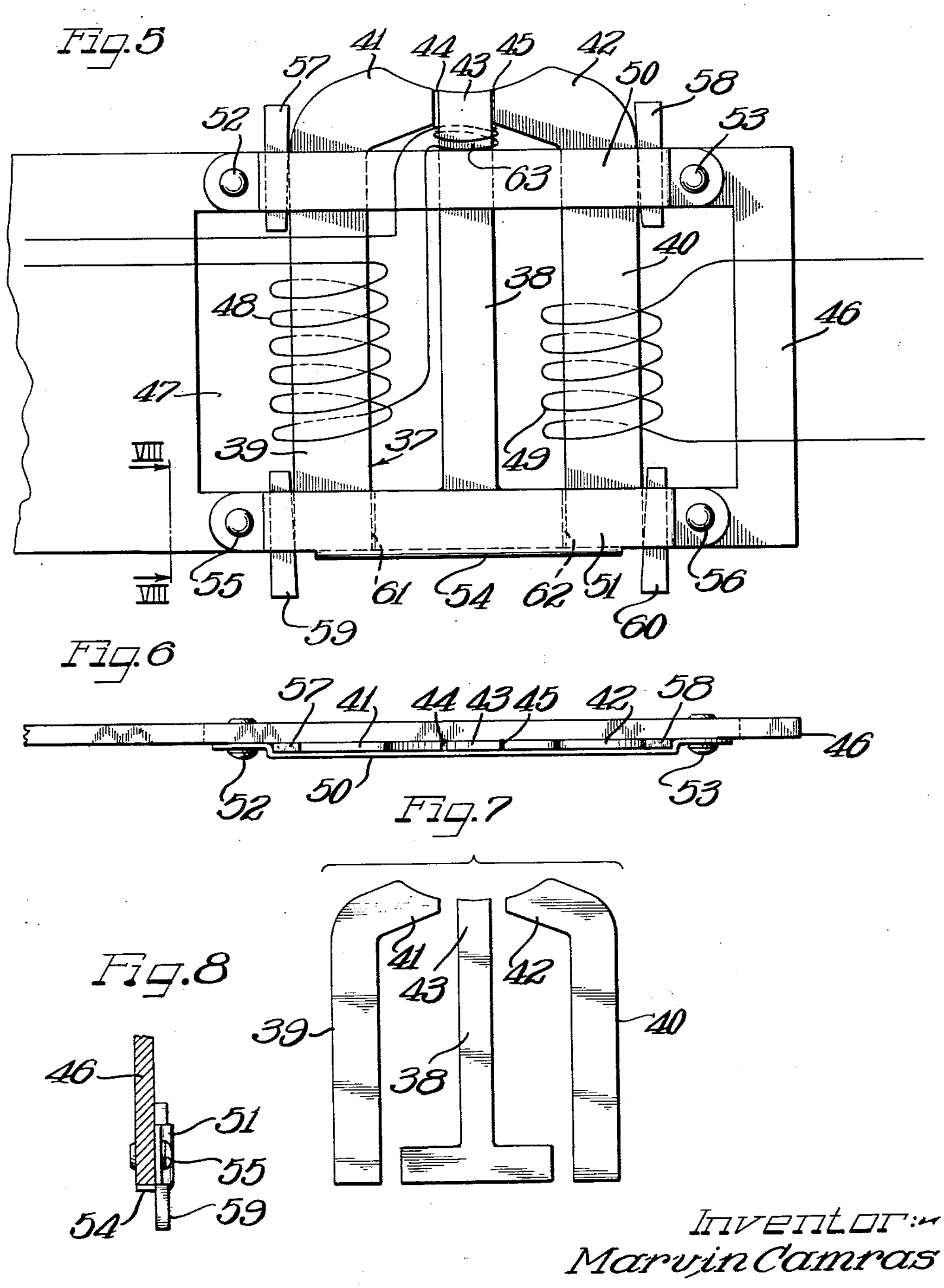
Figure 5 is a diagrammatic, front elevational view of a second embodiment of an electromagnetic transducer head embodying the novel teachings and principles of the present invention.
Figure 6 is a plan view of the head shown in Figure 5.
Figure 7 is an exploded, reduced view of the core pieces employed in the electromagnetic transducer head shown in Figure 5.
Figure 8 is a fragmentary end view of the head shown in Figures 5 and 6, as taken along the line VIII—VIII of Figure 6.

In assembled position, the legs 15 and 16 overlap the upstanding legs of the U-shaped member 14 within the confines of the coils 11 and 12. The end plates or flanges 20 of the coils 11 and 12 are provided with rectangular openings through which the nested legs extend such, for example, as is illustrated in Figure 3, where the legs 15 and the upstanding leg of the piece 14 are shown extending through the end wall 20 of the coil 11.

The assembled core pieces, together with their coils 11 and 12, are clamped to a mounting plate or arm 13 by means of straps 21 and 22. A large opening 23 is, of course, provided in the mounting plate 13 to accommodate the coils 11 and 12 and enable the core part 10 to lie flat against one face of the mounting plate or arm 13.

The strap brackets 21 and 22 extend across the core part with their ends extending through slots 24 in the mounting plate 13 and are then bent over as at 25 to tightly clamp the core 10 against the mounting plate 13. The pole portions 17 and 18 of the core structure 10 are arranged to bear against a magnetizable record member 26 as it rides over a capstan or other rotary stabilizing element 27. When the plate or arm 13 is formed of a conducting material such as brass or aluminum, it is, of course, desirable to insulate the strap brackets 21 and 22 from the plate 13. This may be conveniently done by merely painting a coating of insulation on the metal parts.

Figure 4:
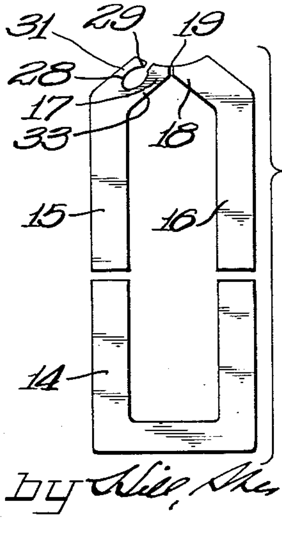
Figure 4 is a reduced, exploded view of the core pieces of the electromagnetic transducer head shown in Figure 1.

It will be observed from an inspection of Figures 1 and 4 of the drawings that the top surface of the poles 17 and 18 are shaped to conform to the cylindrical surface of the rotary stabilizing element 27, thereby to provide continuous contact with the record member 26 as it crosses the upper surface of the poles.

One of the distinctive features of the present invention is the provision of a special arrangement for obtaining an erase flux and a high frequency bias flux in the head without providing the usual additional third leg. As is clearly shown in Figures 1 and 4 of the drawings, the upper portion of the leg 15 is provided with a small opening 28 therein, and a slot 29 extends from this opening 28 toward the upper edge of the pole portion 17. This slot 29 extends at right angles to the upper edge of the pole portion 17. It will thus be observed that a second gap is provided across which the record member 26 passes. This second gap 29 is on the side of the main gap 19 so that the record member 26 reaches the gap 29 first.

An erase coil 30 is wound around the portion of the pole portion 17 through the opening 28. The coil 30 thus surrounds a region 31 of the pole portion 17 which lies between the hole 28 and the outer edge of the leg 15. A second coil 32 is wound through the opening 28 around the portion 33 of the leg 15 which lies between the opening 28 and the inner edge of the leg 15. This coil 32 is in series with the coil 30 and is wound in such direction as to cause flux to flow in the same direction around the opening 28 as is produced by the erase winding 30. This flux which flows around the opening 28 and which is produced mainly by the erase winding 30 is the erase flux which causes demagnetization of the magnetizable record member 26 as it passes over the non-magnetic gap 29. The winding 32 is primarily the high frequency bias winding and part of the flux set up by this winding 32 is caused to pass around the main core 10 including leg 15, U-shaped bottom member 14, leg 16 and the non-magnetic gap 19. This high frequency bias flux is thus superimposed on the signal or audio flux in the region of the non-magnetic gap 19.

The coils 11 and 12 are energized through conductors 34 and 35 with the fluctuating signal voltage to be recorded on the record member 26. The coils 11 and 12 are connected in series by a conductor 36 and, of course, are so wound as to be in aiding relation with respect to each other and to set up a flux in the main core 10.

A modified form of the present invention is illustrated in Figures 5 to 8 of the drawings. More specifically, the core 37 of the electromagnetic transducer head includes an inverted T-shaped central member 38 and two generally inverted L-shaped side members 39 and 40. The upper leg portions 41 and 42 of the legs 39 and 40, respectively, provide two pole portions of the core structure and extend into close proximity to the upper portion 43 of the inverted T-shaped center leg 38. This upper portion 43 provides the cooperating pole portions with the portions 41 and 42 which define the two non-magnetic gaps 44 and 45 in the assembled head, the former being the erase gap and the latter being the record gap. These three core pieces are conveniently mounted on a non-magnetic mounting plate 46 having a relatively large central opening 47 therein to accommodate the coils 48 and 49 which are wound on the legs 39 and 40, respectively.

The three core pieces 38, 39 and 40 are clamped into position on the mounting plate 46 by a pair of brackets 50 and 51. The bracket 50 overlies the upper portion of the core pieces 38, 39 and 40 and is riveted or otherwise suitably secured to the mounting plate 46 as at 52 and 53. The lower bracket member 51 includes a lower lip portion 54 which extends underneath the core pieces 38, 39 and 40 and conveniently supports them in vertically aligned relation with respect to each other when they are being clamped into place. The lower bracket member 51 is riveted or otherwise suitably secured to the mounting plate 46 in any suitable manner such as by rivets 55 and 56.

The non-magnetic gaps 44 and 45 are preferably in the form of small shims or spacer pieces of non-magnetic material such, for example, as copper or mica. Since these non-magnetic spacers 44 and 45 determine the actual size of the non-magnetic gaps, it will be apparent that the head may be quickly and conveniently assembled by means of small wedge members 57, 58, 59 and 60. While four such wedge members have been shown, it will, of course, be understood that only a part of these may be used if desired, for example, as wedge members 57 and 59. Since the wedges are driven into the bracket members before the core pieces are finally glued or otherwise secured in place, it will be apparent that the outer core pieces 39 and 40 will be pressed tightly against the spacers which define the non-magnetic gaps 44 and 45. When wedges are used on one side only, the head core is definitely located in the frame.

It has been found desirable under some circumstances to provide additional spacer members 61 and 62 between the lower ends of the core pieces 39 and 40 and the ends of the base of the inverted T-shaped member 38. This is particularly desirable when the electromagnetic transducer head is being used as a record head only.

The high frequency bias usually found desirable in a recording operation is provided by taking a few turns of the conductor to the erase coil 48 around the upper portion of the core piece 38 above the bracket 50 as at 63.

It will be understood that modifications and variations may be effected without departing from the scope of the novel concepts of the present invention.

I claim as my invention:

1. An electromagnetic transducer head assembly comprising a support member having an opening therein, a magnetic core including a pair of inverted L-shaped pieces and an inverted T-shaped piece all disposed against said support member and spanning the opening therein, the end of the leg of the T-shaped piece and the bases of the two L-shaped pieces overhanging said support member and positioned to define a pair of non-magnetic gaps, a pair of strap brackets straddling said legs and secured to said support member on opposite sides of their openings, thereby to secure said legs to said support member, and coil means mounted on at least one of said legs within said opening.

2. An electromagnetic transducer head assembly comprising a support member having an opening therein, a magnetic core including a pair of inverted L-shaped pieces and an inverted T-shaped piece all disposed against said support member and spanning the opening therein, the end of the leg of the T-shaped piece and the bases of the two L-shaped pieces overhanging said support member and positioned to define a pair of non-magnetic gaps, a pair of strap brackets straddling said legs and secured to said support member on opposite sides of their openings, thereby to secure said legs to said support member, an erase coil mounted within said opening on one of said inverted L-shaped pieces, a signal coil on the other of said inverted L-shaped pieces mounted within said opening on the other of said inverted L-shaped pieces, and a high frequency bias coil mounted on the overhanging portion of said inverted T-shaped piece.

3. An electromagnetic transducer head assembly comprising a support member having an opening therein, a magnetic core including a pair of inverted L-shaped pieces and an inverted T-shaped piece all disposed against said support member and spanning the opening therein, the end of the leg of the T-shaped piece and the bases of the two L-shaped pieces overhanging said support member and positioned to define a pair of non-magnetic gaps, a pair of strap brackets straddling said legs and secured to said support member on opposite sides of their openings, thereby to secure said legs to said support member, coil means mounted on at least one of said legs within said opening, at least one end of one of said straps providing a spaced shoulder between it and the outer side edge of one of said inverted L-shaped pieces, and a wedge disposed in the space between said shoulder and said last mentioned L-shaped piece.

4. An electromagnetic transducer head assembly comprising a support member having an opening therein, a magnetic core including a plurality of legs disposed against said support member and spanning said opening, said legs extending beyond said member on one side thereof, at least one of said legs having a portion extending toward another of said legs and terminating just short thereof to define a non-magnetic gap across which a record member is arranged to pass, a spacer in said gap of a dimension defining substantially the desired width of said gap, clamping means securing said legs to said support member including a strap bracket extending across said legs over the marginal portion of said support member along said opening on the side where said legs overhang, said strap bracket including a shoulder portion lying opposite a side edge of one of said legs and spaced therefrom, a wedge in said space between said shoulder and said side edge arranged to be driven tight, whereby to force said two legs defining said non-magnetic gap toward each other and to tightly clamp said spacer therebetween, and coil means mounted on said core.

5. An electromagnetic transducer head assembly comprising a rigid support member having a flat planar extended locating surface and having an opening in said surface, a magnetic core having legs of flat strip material extending across said opening and disposed in flatwise extended surface contacting relation to said locating surface, said legs being shaped and positioned to define a non-magnetic gap over which a magnetic record member is arranged to pass, a flexible band extending across said legs in the vicinity of said gap, said band being of flexible material and of substantially thinner cross section than said rigid support member, and means securing the opposite ends of the band to the rigid support member and tensioning the band in a direction generally normal to said locating surface to press the surfaces of said legs facing said locating surface into extended continuous conforming planar relation thereto in the vicinity of said gap.

6. An electromagnetic transducer head assembly comprising a rigid support member having a flat planar extended locating surface and having an opening in said surface, a magnetic core having legs of flat strip material extending across said opening and disposed in flatwise extended surface contacting relation to said locating surface, said legs being shaped and positioned to define a non-magnetic gap over which a magnetic record member is arranged to pass, a flexible band extending across said legs in the vicinity of said gap, said band being of flexible material and of substantially thinner cross section than said rigid support member, and means securing the opposite ends of the band to the rigid support member and tensioning the band in a direction generally normal to said locating surface to press the surfaces of said legs facing said locating surface into extended continuous conforming planar relation thereto in the vicinity of said gap, said band including a shoulder portion lying adjacent a side edge of one of the legs, and wedge means associated with the shoulder and side edge forcing said one leg toward the other leg to urge the legs toward each other at said non-magnetic gap.

References Cited in the file of this patent

UNITED STATES PATENTS

| | | |
|---|---|---|
| 661,619 | Poulsen | Nov. 13, 1900 |
| 788,790 | Pederson | May 2, 1905 |
| 2,535,480 | Begun | Dec. 26, 1950 |
| 2,574,707 | Peltus | Nov. 13, 1951 |
| 2,592,652 | Buhrendorf | Apr. 15, 1952 |